(12) United States Patent
Stephen

(10) Patent No.: US 10,736,279 B2
(45) Date of Patent: Aug. 11, 2020

(54) METHOD AND SYSTEM FOR IN ROW VARIABLE RATE PRECISION IRRIGATION

(71) Applicant: Tony Stephen, Hopland, CA (US)

(72) Inventor: Tony Stephen, Hopland, CA (US)

( * ) Notice: Subject to any disclaimer, the term of this patent is extended or adjusted under 35 U.S.C. 154(b) by 329 days.

(21) Appl. No.: 15/398,521

(22) Filed: Jan. 4, 2017

(65) Prior Publication Data

US 2017/0265404 A1    Sep. 21, 2017

Related U.S. Application Data

(60) Provisional application No. 62/274,380, filed on Jan. 4, 2016, provisional application No. 62/394,215, filed on Sep. 14, 2015.

(51) Int. Cl.
*A01G 25/16* (2006.01)
*A01G 25/02* (2006.01)
*A01G 17/02* (2006.01)
*B05B 12/08* (2006.01)

(52) U.S. Cl.
CPC .......... *A01G 25/165* (2013.01); *A01G 17/02* (2013.01); *A01G 25/02* (2013.01); *A01G 25/023* (2013.01); *B05B 12/087* (2013.01)

(58) Field of Classification Search
CPC ...... A01G 25/00; A01G 25/02; A01G 25/023; A01G 25/06; A01G 25/09; A01G 25/16; A01G 25/162; A01G 25/165; A01G 17/02; A01G 25/026; A01G 2025/006; B05B 1/202; B05B 1/3006; B05B 1/323; B05B 12/04; B05B 12/087

USPC .......................................................... 239/542
See application file for complete search history.

(56) References Cited

U.S. PATENT DOCUMENTS

| | | | | |
|---|---|---|---|---|
| 3,402,890 | A * | 9/1968 | Heitzman | A01G 25/162 239/66 |
| 3,885,743 | A * | 5/1975 | Wake | A01G 25/023 239/542 |
| 3,887,139 | A * | 6/1975 | Pearce | A01G 25/023 239/542 |
| 4,365,750 | A * | 12/1982 | Carlberg | B05B 1/12 239/276 |
| 4,722,481 | A * | 2/1988 | Lemkin | A01G 25/023 137/513.5 |
| 5,222,671 | A * | 6/1993 | Smiley | B05B 1/3006 239/533.1 |
| 7,337,983 | B1 * | 3/2008 | Boice | A01G 25/02 239/1 |
| 2004/0222325 | A1 * | 11/2004 | Regev | A01G 25/023 239/569 |
| 2010/0252127 | A1 * | 10/2010 | Gross | A01G 25/023 137/542 |
| 2014/0252117 | A1 * | 9/2014 | Hamann | A01G 25/026 239/73 |

* cited by examiner

*Primary Examiner* — Cody J Lieuwen
(74) *Attorney, Agent, or Firm* — Michael A. Guth

(57) ABSTRACT

An irrigation management system which allows for modulation of the watering gradient along crop rows. The system may include dual drip lines which allow for selection of gradients based upon the time each of the dual lines is active. The system may utilize pressure sensitive valves which select drip lines based upon the inlet feed water pressure. The system may include drip emitters which modify flow rates based upon inlet feed water pressure.

4 Claims, 9 Drawing Sheets

| Gradient Type | Gradient(GR) & Counter Gradient(CG) (gph) | Runtime (minutes) | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|---|
| Balanced | GR | 120 | 2 | 2 | 2 | 2 | 1.5 | 1.5 | 1.5 | 1.5 | 1 | 1 | 1 | 1 | 0.5 | 0.5 | 0.5 | 0.5 | 0 | 0 | 0 | 0 |
| Balanced | CG | 120 | 0 | 0 | 0 | 0 | 0.5 | 0.5 | 0.5 | 0.5 | 1 | 1 | 1 | 1 | 1.5 | 1.5 | 1.5 | 1.5 | 2 | 2 | 2 | 2 |
| Balanced | Total | 240 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
FIG. 6A
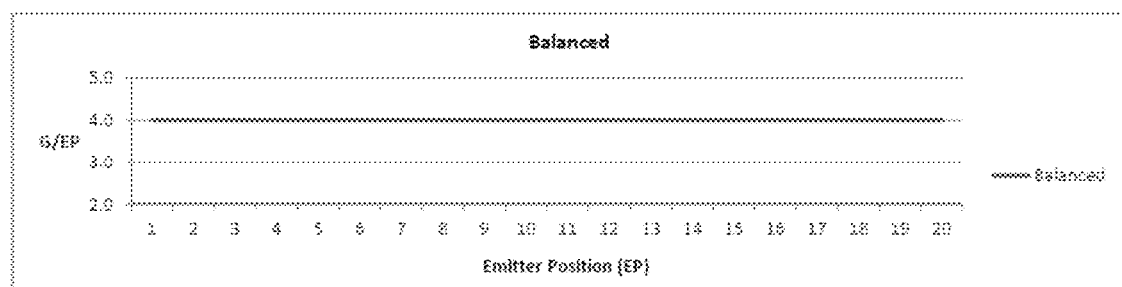
FIG. 6B
| | | | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|---|
| Full Gradient | GR | 240 | 2 | 2 | 2 | 2 | 1.5 | 1.5 | 1.5 | 1.5 | 1 | 1 | 1 | 1 | 0.5 | 0.5 | 0.5 | 0.5 | 0 | 0 | 0 | 0 |
| Full Gradient | CG | 0 | 0 | 0 | 0 | 0 | 0.5 | 0.5 | 0.5 | 0.5 | 1 | 1 | 1 | 1 | 1.5 | 1.5 | 1.5 | 1.5 | 2 | 2 | 2 | 2 |
| Full Gradient | Total | 240 | 8.0 | 8.0 | 8.0 | 8.0 | 6.0 | 6.0 | 6.0 | 6.0 | 4.0 | 4.0 | 4.0 | 4.0 | 2.0 | 2.0 | 2.0 | 2.0 | 0.0 | 0.0 | 0.0 | 0.0 |
FIG. 7A
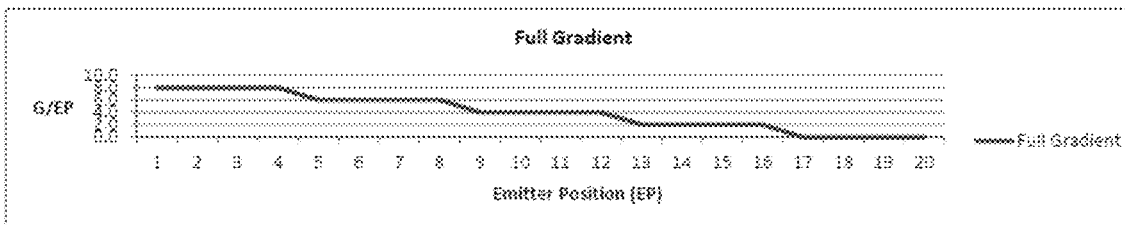
FIG. 7B

|              |       |     | 1   | 2   | 3   | 4   | 5   | 6   | 7   | 8   | 9   | 10  | 11  | 12  | 13  | 14  | 15  | 16  | 17  | 18  | 19  | 20  |
|--------------|-------|-----|-----|-----|-----|-----|-----|-----|-----|-----|-----|-----|-----|-----|-----|-----|-----|-----|-----|-----|-----|-----|
| Full Counter | GR    | 0   | 2   | 2   | 2   | 2   | 1.5 | 1.5 | 1.5 | 1.5 | 1   | 1   | 1   | 1   | 0.5 | 0.5 | 0.5 | 0.5 | 0   | 0   | 0   | 0   |
| Full Counter | CG    | 240 | 0   | 0   | 0   | 0   | 0.5 | 0.5 | 0.5 | 0.5 | 1   | 1   | 1   | 1   | 1.5 | 1.5 | 1.5 | 1.5 | 2   | 2   | 2   | 2   |
| Full Counter | Total | 240 | 0.0 | 0.0 | 0.0 | 0.0 | 2.0 | 2.0 | 2.0 | 2.0 | 4.0 | 4.0 | 4.0 | 4.0 | 6.0 | 6.0 | 6.0 | 6.0 | 8.0 | 8.0 | 8.0 | 8.0 |
FIG. 8A
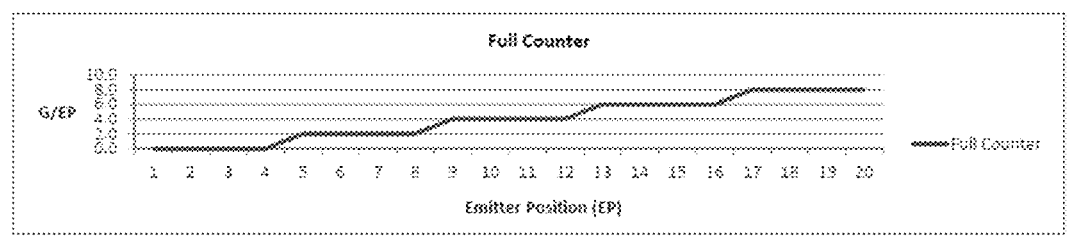
FIG. 8B
|               |       |     | 1   | 2   | 3   | 4   | 5   | 6   | 7   | 8   | 9   | 10  | 11  | 12  | 13  | 14  | 15  | 16  | 17  | 18  | 19  | 20  |
|---------------|-------|-----|-----|-----|-----|-----|-----|-----|-----|-----|-----|-----|-----|-----|-----|-----|-----|-----|-----|-----|-----|-----|
| More Gradient | GR    | 180 | 2   | 2   | 2   | 2   | 1.5 | 1.5 | 1.5 | 1.5 | 1   | 1   | 1   | 1   | 0.5 | 0.5 | 0.5 | 0.5 | 0   | 0   | 0   | 0   |
| More Gradient | CG    | 60  | 0   | 0   | 0   | 0   | 0.5 | 0.5 | 0.5 | 0.5 | 1   | 1   | 1   | 1   | 1.5 | 1.5 | 1.5 | 1.5 | 2   | 2   | 2   | 2   |
| More Gradient | Total | 240 | 6.0 | 6.0 | 6.0 | 6.0 | 5.0 | 5.0 | 5.0 | 5.0 | 4.0 | 4.0 | 4.0 | 4.0 | 3.0 | 3.0 | 3.0 | 3.0 | 2.0 | 2.0 | 2.0 | 2.0 |
FIG. 9A
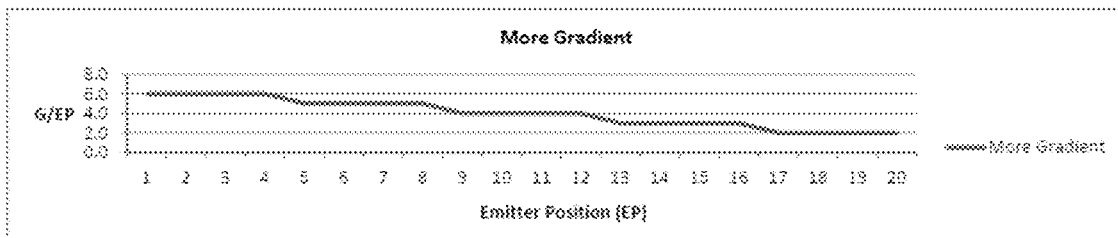
FIG. 9B

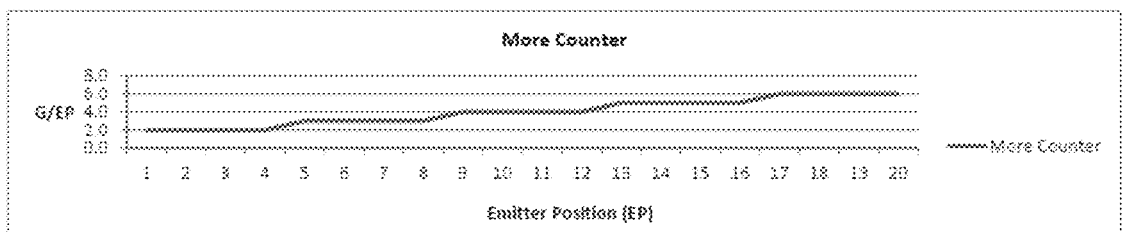
FIG. 10A
FIG. 10B
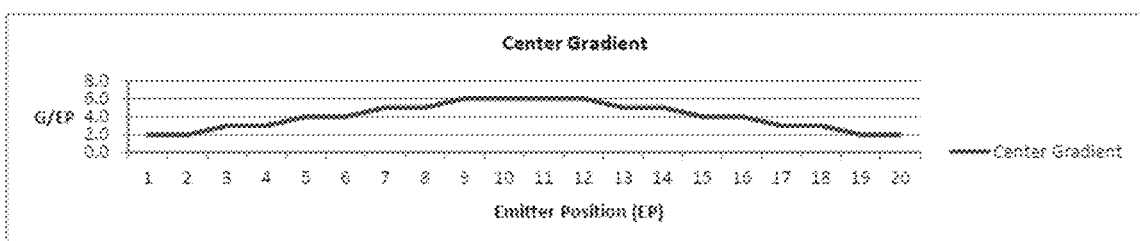
FIG. 11A
FIG. 11B

| | | | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|---|
| End Gradient | GR | 180 | 2 | 2 | 1.5 | 1.5 | 1 | 1 | 0.5 | 0.5 | 0 | 0 | 0 | 0 | 0.5 | 0.5 | 1 | 1 | 1.5 | 1.5 | 2 | 2 |
| End Gradient | CG | 60 | 0 | 0 | 0.5 | 0.5 | 1 | 1 | 1.5 | 1.5 | 2 | 2 | 2 | 2 | 1.5 | 1.5 | 1 | 1 | 0.5 | 0.5 | 0 | 0 |
| End Gradient | Total | 240 | 6.0 | 6.0 | 5.0 | 5.0 | 4.0 | 4.0 | 3.0 | 3.0 | 2.0 | 2.0 | 2.0 | 2.0 | 3.0 | 3.0 | 4.0 | 4.0 | 5.0 | 5.0 | 6.0 | 6.0 |

METHOD AND SYSTEM FOR IN ROW VARIABLE RATE PRECISION IRRIGATION

CROSS-REFERENCE TO RELATED APPLICATIONS

This application claims priority to U.S. Provisional Application No. 62/274,380 to Stephen, filed Jan. 4, 2016, which is hereby incorporated by reference in its entirety. This application claims priority to U.S. Provisional Application No. 62/394,215 to Stephen, filed Sep. 14, 2016, which is hereby incorporated by reference in its entirety.

BACKGROUND

Field of the Invention

This invention relates to an irrigation system and method, and more specifically to drip irrigation systems with controllable flow gradients.

Description of Related Art

Irrigation systems for domestic crops, commercial landscapes, nurseries, and the like, often utilize irrigation management systems. A typical management system involves the programming of irrigation schedules, such that an entire area to be irrigated is irrigated en masse for a particular length of time, usually per day.

A time based irrigation management system has enabled irrigation of crops, plants, and landscapes to be performed automatically and on a regular schedule, but these systems have a deficiency in that they do not account for seasonal changes and local weather conditions. A basis of this drawback is that any system which is programmed to deliver any volume of water above and beyond the minimum amounted required may be considered to be wasteful of water resources. Conversely, the under delivery of water and nutrients can adversely affect production and profitability.

Water lost to evaporation may be minimized with the implementation of drip irrigation systems. In such a system, feeder lines may be used down rows of crops with water emitting devices spaced along the length of the feeder line. In passive systems, the water distributed along the length of the row is determined by the length of time that the feeder line is supplied with water pressure, but the relative distribution along the row remains constant. In some other systems, the water emitting devices along the length of the feeder line are actively controlled, such as with the use of an electrically controlled valve. With such a system, the water distribution may be precisely controlled.

A drawback with the passive system described above is that water distribution along the length of the row, relative to positions on that row, cannot be modified easily. A drawback with the precisely controlled system described above is that such a system is exorbitantly expensive, and also may need significant maintenance.

What is called for is an efficient and low cost system for altering water distribution along rows of crops during irrigation, such as irrigation of plant crops. What is also called for is such a system which lends itself well to being retrofitted into existing irrigation systems.

SUMMARY

An irrigation management system which allows for modulation of the watering gradient along crop rows. The system may include dual drip lines which allow for selection of gradients based upon the time each of the dual lines is active. The system may utilize pressure sensitive valves which select drip lines based upon the inlet feed water pressure. The system may include drip emitters which modify flow rates based upon inlet feed water pressure.

BRIEF DESCRIPTION OF THE DRAWINGS

FIGS. 6A-B are a table and graph of a balanced system according to some embodiments of the present invention.

FIGS. 7A-B are a table and graph of a full gradient system according to some embodiments of the present invention.

FIGS. 8A-B are a table and graph of a full counter system according to some embodiments of the present invention.

FIGS. 9A-B are a table and graph of a more gradient system according to some embodiments of the present invention.

FIGS. 10A-B are a table and graph of a more counter system according to some embodiments of the present invention.

FIGS. 11A-B are a table and graph of a center gradient system according to some embodiments of the present invention.

DETAILED DESCRIPTION

Figure 1:
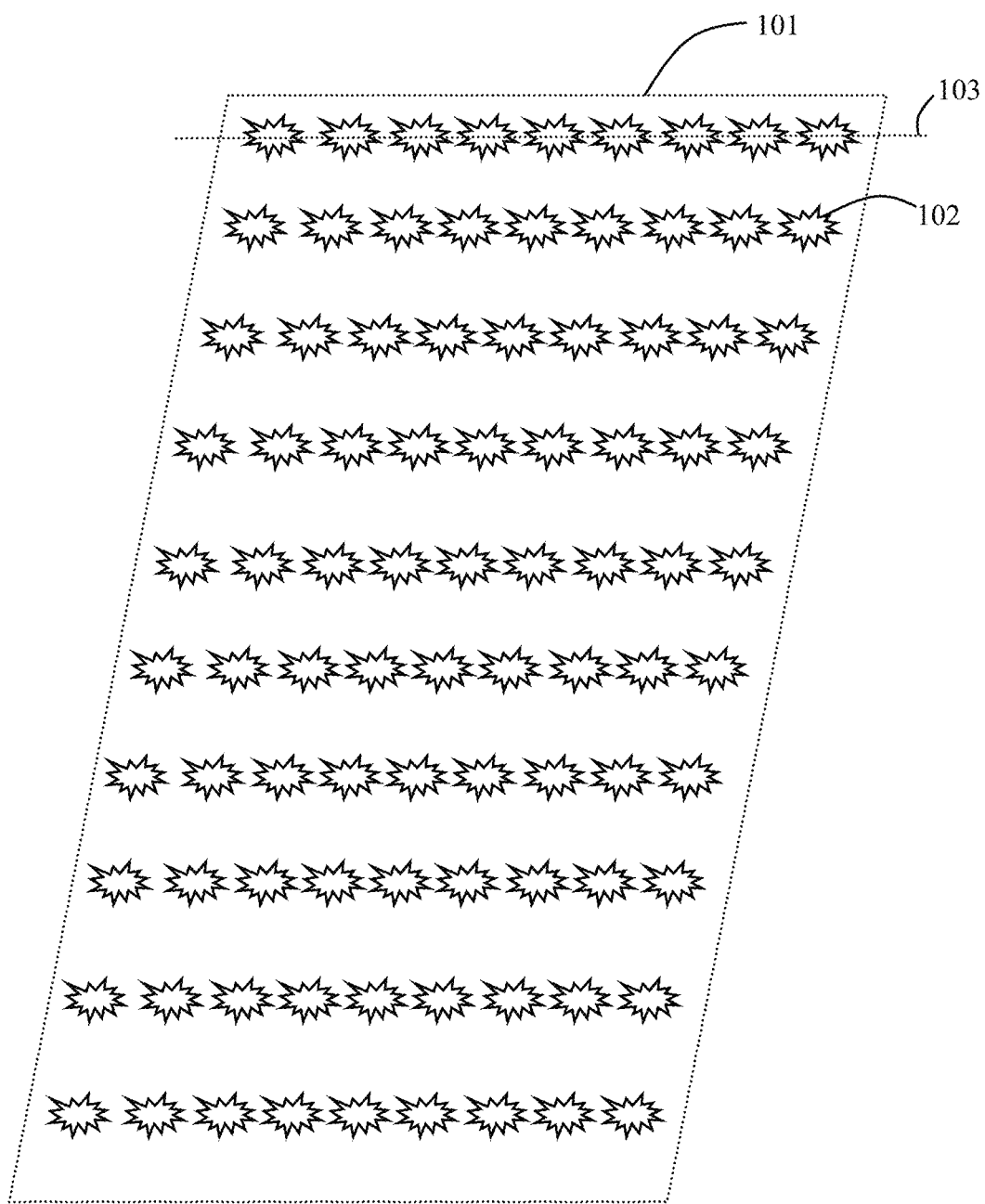
FIG. 1 is an illustration of a plot of crops grown in rows.

FIG. 1 illustrates a plot 101 of land with rows 103 of plants 102. In some aspects, the plants 102 may produce crops. In some aspects, the plants 102 may be grape vineyards grown in a production vineyard. The plants 102 may be organized into rows 103. Although discussed primarily with a focus on perennial crops, such as trees and vines, aspects of this invention may also bring considerable improvements to other irrigated systems, such as row crops and landscaping.

Figure 2:
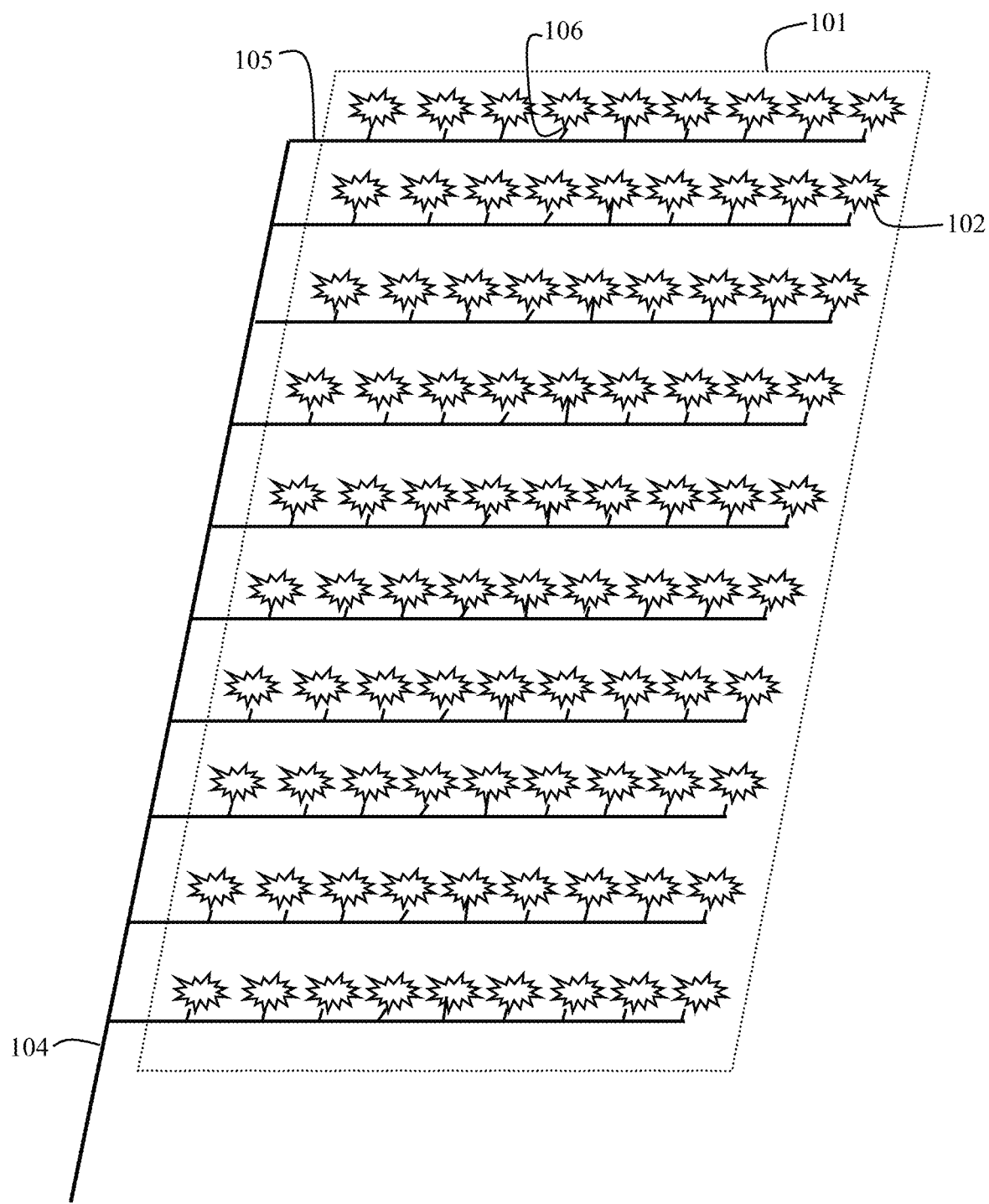
FIG. 2 is an illustration of a drip irrigation system for a plot of crops grown in rows.

FIG. 2 illustrates a plot 101 of land with rows of plants 102 with an irrigation system. A supply inlet 104, which may commonly be called a sub-main, supplies a plurality of row feeds 105. The row feeds 105, which may commonly be called laterals, run down the rows of plants 102. A distribution portion 106 supplies water individually to each plant 102. In some aspects, and with some crop types, the distribution portions 106 may be spaced down a row of plants but may not be individually associated with individual plants. In some aspects, the distribution portions 106 may be voids along the row feeds 105 which allow for the emission of water at each point. In some aspects, the distribution portions 106 may be emitter devices adapted for emission of water at each point. In the system as seen in FIG. 2, water is supplied via the supply inlet 104 and is branched off into each of the row feeds 105. Water running down the row feeds 105 then is distributed to the row at each distribution point 106. The irrigation is pre-set based upon water pressure through the supply inlet 104 and the capacities of the supply inlet 104, the row feeds 105, and the distribution portions 106.

Figure 3:
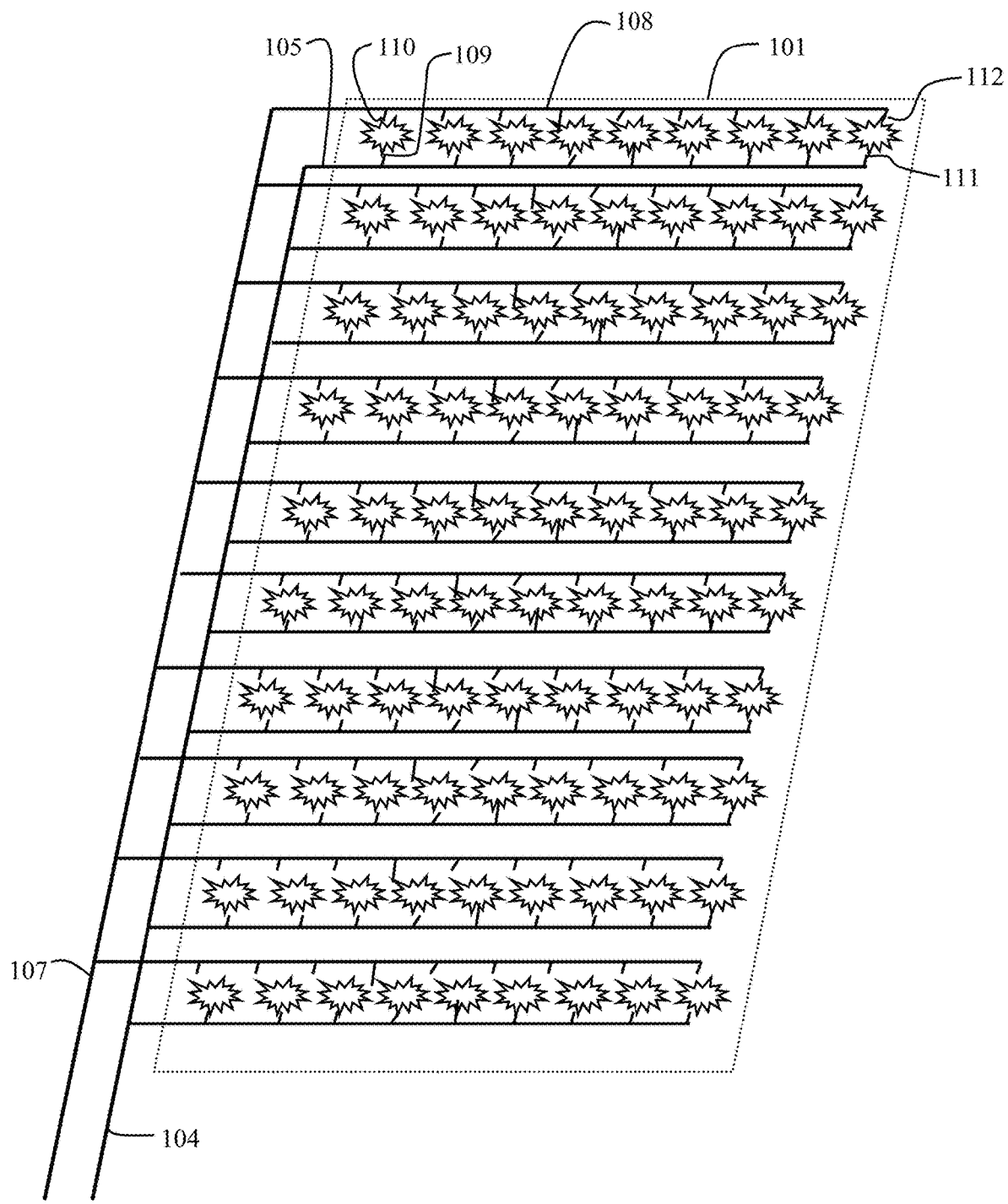
FIG. 3 is an illustration of a drip irrigation system for a plot of crops grown in rows according to some embodiments of the present invention.

In some embodiments of the present invention, as seen in FIG. 3, a plot of land 101 with rows of plants has two row feeds per row. A first supply inlet 104 feeds a first plurality of row feeds 105, and a second supply inlet 107 supplies a second plurality of row feeds 108. The first plurality of row feeds 105 has a plurality of distribution points beginning with a first distribution point 109 at a first end of the row feed 105 and last distribution point 111 at the second end of the row feed 105. The second plurality of row feeds 108 has a plurality of distribution points beginning with a first distribution point 110 at a first end of the row feed 108 and a last distribution point 112 at the second end of the row feed 108. Although shown on opposite sides of the plants in FIG. 3, the first plurality of row feeds 105 and the second plurality of row feeds 108 may be directly next to each other. In some aspects, there may be one or more first row feeds 105 and one or more second row feeds 108.

The distribution points along the first row feed 105 are adapted to deliver different amounts of water for the same time period while water flows into the first row feed 105 from the first supply inlet 104. For example, along the first row feed 105 the first distribution point 109 may deliver a highest amount of water per unit time, and the last distribution point 111 may deliver the lowest amount of water per unit time. Similarly, the distribution points along the second row feed 108 also adapted to deliver different amounts of water for the same time period while water flows into the second row feed 108 from the second supply inlet 107. But in contrast, along the second row feed 108 the first distribution point 110 may deliver the lowest amount of water per unit time, and the last distribution point 112 may deliver the highest amount of water per unit time. The reversed distribution gradients of the two row feeds allow for significant adaptability for implementing a variety of watering profiles along the row, and within the plot 101. Although illustrated in FIG. 3 as being on opposite sides of the plants in a row, the row feeds 105, 108 may be on the same side of the plants in a row.

The gradient along the first row feed seen going down the row, and the counter gradient along the second row feed, allow for more precise watering of the plants on the plot of land, which enhances agricultural success and reduces water use. For example, there may be some sloping on the plot which affects the water needs by plants at different locations along the row. Also, there may be variations in soil type which affect water availability to the plant. This condition can be addressed by the precision irrigation systems described herein.

In some aspects, emitters may be used which are not substantially sensitive to the inlet pressure, within a range. For example, the emitters may be adapted to provide a pre-determined amount of water per unit time, such as 0.5 gallons per hour, 1.0 gallons per hour, or 2.0 gallons per hour. The flow rate may be relatively constant at any inlet pressure in the range of 10-50 psi, for example. With pressure compensating emitters which maintain flow rates over a pressure range, as discussed above, the flow rate along the row feed, which may be ascending, descending, or of another type along the row feed, may be maintained even with variations in the inlet pressure. This will allow a system where flow rates may be maintained as designed for flow rates even with expected variations in the inlet pressures. Also, wherein there may be a pressure operated switching valve which switches water flow from a first supply inlet (feeding first row feeds) to a second supply inlet (feeding second row feeds), the change in inlet pressure on the second supply inlet used to switch the valve may be accommodated by the pressure compensating emitters such that emitter flow rates are not affected whether the system is running at a lower or higher inlet pressure.

With a system as illustrated in FIG. 3, the amount of time that each of the supply inlets are charged relative to each other will then change the amount of water emitted along the row. For example, if both supply inlets are charged for an equal amount of time, there may be even and equal water emission along the row. FIGS. 6A and 6B illustrate this case. FIG. 6A is a table demonstrating a row with two row feeds, designated GR (for gradient) and CG (for counter gradient). As seen in FIG. 6A, the first four GR emitters are adapted to emit 2 water quantities per unit time (for example, 2 gallons per hour), and then they are reduced as one moves further down the row. The CG row feed, in contrast, has the water quantities per unit time reversed relative to the GR row feed. In some embodiments, the total water quantity per unit time of the two distribution portions at the same spot along the row adds up to the same amount, although different gradient approaches could be implemented. As seen in the irrigation selection of FIGS. 6A and 6B, both row feeds are running for two hours, and each spot along the row (serviced by both a GR and a CG distribution portion) receives 4 gallons of water.

FIGS. 7A and 7B illustrate a full gradient case wherein the row feeds are adapted with emitters identical to those seen in FIGS. 6A and 6B, but the operational situation is different. The GR emitters are operated for 4 hours, and the CG emitters are not operated. The water received along the row is seen if FIG. 7B, and varies from 8 gallons at the first end to 0 gallons at the second end.

FIGS. 8A and 8B illustrate a full counter gradient case wherein the row feeds are adapted with emitters identical to those seen in FIGS. 6A and 6B, but the operational situation is different. The CG emitters are operated for 4 hours, and the GR emitters are not operated. The water received along the row is seen if FIG. 8B, and varies from 0 gallons at the first end to 8 gallons at the second end.

FIGS. 9A and 9B illustrate an enhanced gradient case wherein the row feeds are adapted with emitters identical to those seen in FIGS. 6A and 6B, but the operational situation is different. The GR emitters are operated for 3 hours, and the CG emitters are operated for one hour. The water received along the row is seen if FIG. 9B, and varies from 6 gallons at the first end to 2 gallons at the second end.

FIGS. 10A and 10B illustrate an enhanced counter gradient case wherein the row feeds are adapted with emitters identical to those seen in FIGS. 6A and 6B, but the operational situation is different. The GR emitters are operated for 1 hour, and the CG emitters are operated for 3 hours. The water received along the row is seen if FIG. 10B, and varies from 2 gallons at the first end to 6 gallons at the second end.

FIGS. 11A and 11B illustrate a center gradient case wherein the row feeds are adapted with emitters different from those seen in FIGS. 6A and 6B, and instead have one row feed accented towards the middle of the row, and a second row feed accented towards the end of the row. The GR emitters are operated for 1 hour, and the CG emitters are operated for 3 hours. The water received along the row is seen if FIG. 11B, and varies from 2 gallons at the ends to 6 gallons at the middle of the row.

Figures 12A, 12B:
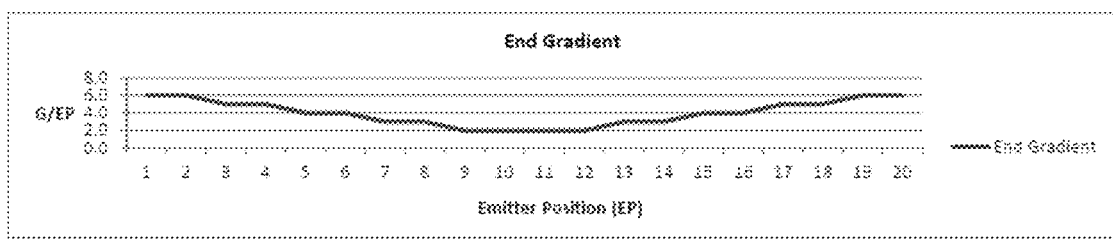
FIGS. 12A-B are a table and graph of an end gradient system according to some embodiments of the present invention.

FIGS. 12A and 12B illustrate a center gradient case wherein the row feeds are adapted with emitters different from those seen in FIGS. 6A and 6B, and instead have one row feed accented towards the middle of the row, and a second row feed accented towards the end of the row, the same as seen in FIGS. 11A and 11B. The GR emitters are operated for 3 hours, and the CG emitters are operated for 1 hour. The water received along the row is seen if FIG. 12B, and varies from 2 gallons at the middles of the row to 6 gallons at the ends of the row.

As seen if FIGS. 6-12, according to some aspects of the present invention, a significant variety of watering gradients can be achieved without control of individual emitters.

Figure 4:
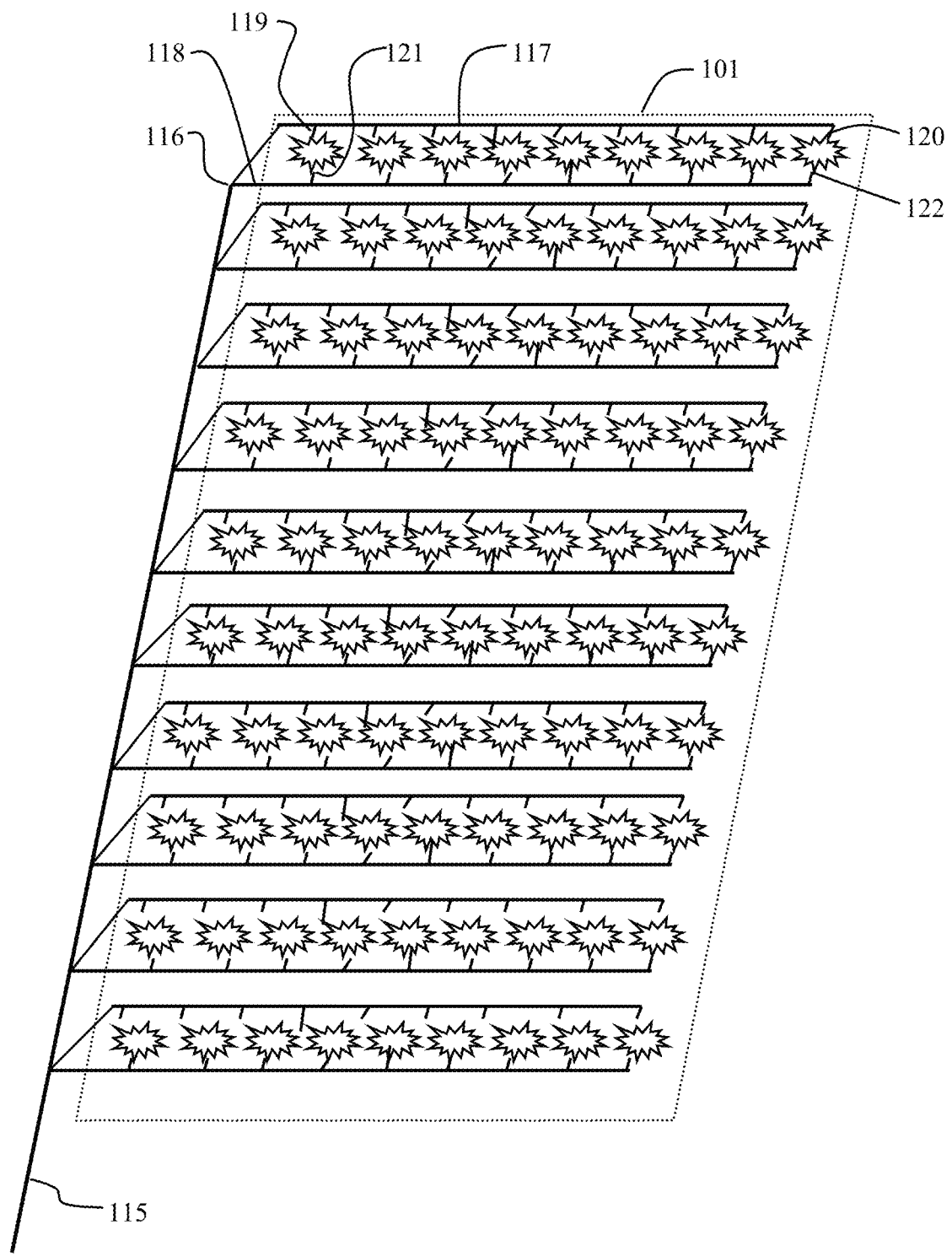
FIG. 4 is an illustration of a drip irrigation system for a plot of crops grown in rows according to some embodiments of the present invention.

In some embodiments of the present invention, as seen in FIG. 4, a plot 101 of land with rows of plants 102 is seen with a single supply inlet 115. The supply inlet 115 provides water to each of the rows. Each of the rows may have a first row feed 117 and a second row feed 118. The first plurality of row feeds 117 has a plurality of distribution points beginning with a first distribution point 119 at a first end of the row feed 117 and last distribution point 120 at the second end of the row feed 117. The second plurality of row feeds 118 has a plurality of distribution points beginning with a first distribution point 121 at a first end of the row feed 118 and a last distribution point 122 at the second end of the row feed 118.

The distribution points along the first row feed 117 are adapted to deliver different amounts of water for the same time period while water flows into the first row feed 117. For example, along the first row feed 117 the first distribution point 119 may deliver a highest amount of water per unit time, and the last distribution point 120 may deliver the lowest amount of water per unit time. Similarly, the distribution points along the second row feed 118 also adapted to deliver different amounts of water for the same time period while water flows into the second row feed 118. But in contrast, along the second row feed 118 the first distribution point 121 may deliver the lowest amount of water per unit time, and the last distribution point 122 may deliver the highest amount of water per unit time. The reversed flow gradients of the two row feeds allow for significant adaptability for implementing a variety of watering profiles along the row, and within the plot 101.

A switching valve 116 is adapted to direct water from the supply inlet 115 into the first row feed 117 and the second row feed 118. In some aspects, the switching valve supplies water to only a single row feed at a time, or to no row feed. In some aspects, the switching valve is adapted to supply water to one of the row feeds at any time the supply inlet 115 is pressurized. In some aspects, the switching valves 116 are adapted to switching valve supplies water to one or both of the row feeds. The switching valve 116 may be a pressure controlled switching valve such that when the supply inlet 115 is pressurized at a first pressure, for example a lower pressure, the water is directed to the first plurality of row feeds 117. When the supply inlet is pressurized at a second pressure, for example at a higher pressure, the water is directed to the second plurality of row feeds 118. This system allows for the use of a single supply inlet. System design may allow for selecting a water flow rate that takes into account the pressure used to supply the particular row feed, as well as pressure losses along row feeds, and taking these factors into account in the emitter design.

In some aspects, an irrigation system may be retrofitted to include a plurality of pressure controlled switching valves and first and second row feeds, allowing for the multitude of gradients discussed above, while maintaining the system's original main and sub-main feeds.

Figure 5:
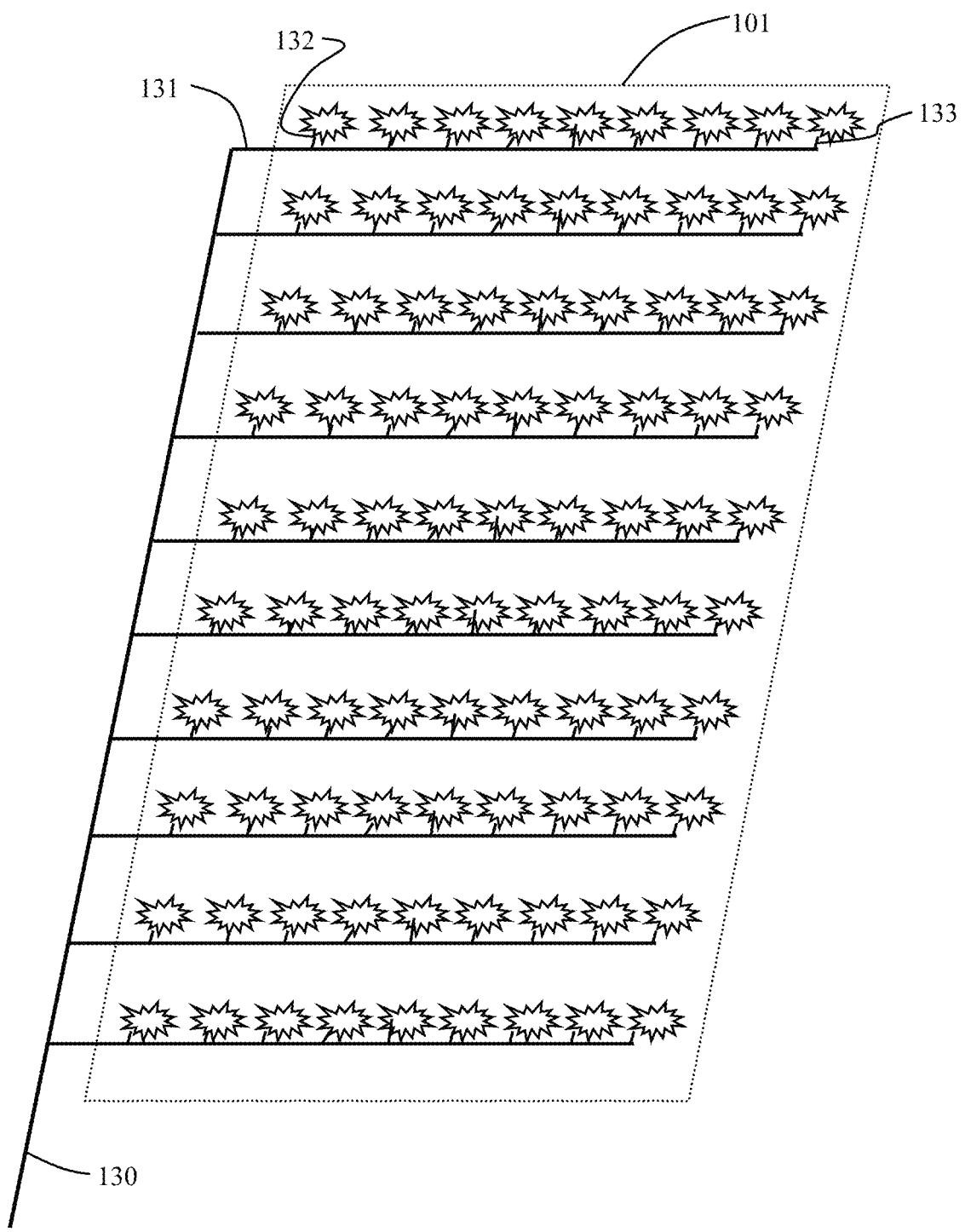
FIG. 5 is an illustration of a drip irrigation system for a plot of crops grown in rows according to some embodiments of the present invention.

In some embodiments of the present invention, as seen if FIG. 5, a plot 101 of land with row crops uses a single supply inlet 130. One or more, or a plurality of row feeds 131 supply water along the row. A first distribution point 132 at a first end of the row feed 131 may be adapted to provide a first amount of water per unit time in a first condition, such as at a first water supply pressure, and may include a pressure valve such that the first distribution point 132 provides a second amount of water per unit time at a second water supply pressure. Similarly, the last distribution point 133 at a second end of the row feed 131 may provide different amounts of water depending upon the inlet pressure. The valved distribution points may provide gradients as seen in FIGS. 6-12.

In some aspects, a system according to embodiments of the present invention may offer different resolution with regard to water delivery gradients. For example, in a field with regular features, such as a flat field, a lower resolution system may be appropriate. In other situations, a higher resolution system may be appropriate. For example, in a 20 row field each row may have two row feeds, but a single valve, or set of valves, may switch all 200 rows from being watered with a first set of row feeds to a second set of row feeds. In this example, all 20 rows would have their watering, and gradients, be the same. This would be the lowest level of resolution for this field. In a more resolute case, the first 10 rows of the 20 row field could be simultaneously controlled, as well as the second 10 rows. In this case, the gradient for the first 10 rows could be set differently than the second 10 rows. This would be a middle level of resolution. In a further example, each of the 20 rows could be switched individually from the first set of row feeds to the second set of row feeds, allowing the gradient on each row to be individually controlled. This would be a high resolution example.

A method for varying the rate of irrigation along a row of plants, which includes the steps of varying the rate of irrigation along the row by switching from a first set of row feeds to a second set of row feeds. The first set of row feeds may emit water along the row in a first fashion, such as increasing the amount of water per unit time along the length of the row by using emitters which emit more water per unit time along the length of the row. The second set of row feeds may emit water along the row in a descending amount of water per unit time along the length of the row. An irrigation gradient may be induced by varying the length of time the different row feeds are pressurized with water. Other types of gradients may be induced, as discussed above, including end heavy or center gradients. In some aspects, switching from one row feed to the other may be done with mechanical switching. In some aspects, switching from one feed to the other may be done with a pressure switch valve. In some aspects, the emitters themselves may switch from a first water delivery amount to another in response to an inlet pressure change.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A system for in row variable rate irrigation, said system comprising:
a plurality of paired row feeds, each of said plurality of paired row feeds comprising a first row feed and a second row feed, wherein said first row feed and said second row feed of each of said plurality of said paired row feeds extend alongside and are adjacent to each other and adapted to irrigate the same row;

a first supply inlet conduit, said first supply inlet conduit coupled to said first row feeds;

a second supply inlet conduit, said second supply inlet conduit coupled to said second row feeds, wherein said first supply inlet conduit and said second supply inlet conduit can be fluidly isolated from each other;

wherein each of said first row feeds has a first end and a second end, said first ends of said first row feeds coupled to said first supply inlet conduit, wherein said first row feeds comprise water emitting portions which emit a first set of differing amounts of water along the length of said first row feeds; and wherein each of said second row feeds has a first end and a second end, said first end of said second row feeds coupled to said second supply inlet conduit, wherein said second row feeds comprise water emitting portions which emit a second set of differing amounts of water along the length of said second row feeds;

wherein the amount of water emitted along the length of a row relative to other positions along the row may be altered by varying the length of time each of the supply inlet conduits is pressurized with water, and wherein said first row feeds emit a descending amount of water volume per unit time along the direction from said first end of said first row feed towards said second end of said first row feed, and wherein said second row feeds emit an ascending amount of water volume per unit time along the direction from said first end of said second row feed towards said second end of said second row feed.

2. The in row variable rate irrigation system of claim 1 wherein said water emitting portions are pressure compensating emitters adapted to provide a fixed flow rate over a range of water pressures.

3. A system for in row variable rate irrigation, said system comprising:

a plurality of paired row feeds, each of said plurality of paired row feeds comprising a first row feed and a second row feed, wherein said first row feed and said second row feed of each of said plurality of said paired row feeds extend alongside and are adjacent to each other and adapted to irrigate the same row;

a first supply inlet conduit, said first supply inlet conduit coupled to said first row feeds;

a second supply inlet conduit, said second supply inlet conduit coupled to said second row feeds, wherein said first supply inlet conduit and said second supply inlet conduit can be fluidly isolated from each other;

wherein each of said first row feeds has a first end and a second end, said first ends of said first row feeds coupled to said first supply inlet conduit, wherein said first row feeds comprise water emitting portions which emit a first set of differing amounts of water along the length of said first row feeds; and wherein each of said second row feeds has a first end and a second end, said first end of said second row feeds coupled to said second supply inlet conduit, wherein said second row feeds comprise water emitting portions which emit a second set of differing amounts of water along the length of said second row feeds;

wherein the amount of water emitted along the length of a row relative to other positions along the row may be altered by varying the length of time each of the supply inlet conduits is pressurized with water, and wherein said first row feeds emit an ascending amount of water volume per unit time along the direction from said first end of said first row feed towards a middle of said first row feed and then a descending amount of water volume per unit time along the direction from the middle of said first row feed towards said second end of said first row feed, and wherein said second row feeds emit a descending amount of water volume per unit time along the direction from said first end of said second row feed towards a middle of said second row feed, and wherein said second row feed emits an ascending amount of water per unit time along the direction from the middle of said second row feed towards said second end of said second row feed.

4. The in row variable rate irrigation system of claim 3 wherein said water emitting portions are pressure compensating emitters adapted to provide a fixed flow rate over a range of water pressures.

\* \* \* \* \*